(12) United States Patent
Juraschka

(10) Patent No.: US 9,564,785 B2
(45) Date of Patent: Feb. 7, 2017

(54) COMBINED END CAP AND ELECTROMECHANICAL DEVICE EQUIPPED WITH THE COMBINED END CAP

(71) Applicant: Bosch Automotive Products (Changsha) Co. Ltd., Changsha Hunan (CN)

(72) Inventor: Andreas Juraschka, Renningen (DE)

(73) Assignee: BOSCH AUTOMOTIVE PRODUCTS (CHANGSHA) CO. LTD., Changsha Hunan (CN)

( * ) Notice: Subject to any disclaimer, the term of this patent is extended or adjusted under 35 U.S.C. 154(b) by 292 days.

(21) Appl. No.: 14/075,648

(22) Filed: Nov. 8, 2013

(65) Prior Publication Data

US 2014/0132120 A1    May 15, 2014

(30) Foreign Application Priority Data

Nov. 9, 2012 (CN) .......................... 2012 1 0446083

(51) Int. Cl.
| | |
|---|---|
| H02K 5/00 | (2006.01) |
| H02K 5/15 | (2006.01) |
| H02K 5/10 | (2006.01) |
| H02K 5/26 | (2006.01) |
| H02K 5/04 | (2006.01) |

(52) U.S. Cl.
CPC . *H02K 5/26* (2013.01); *H02K 5/04* (2013.01)

(58) Field of Classification Search
CPC ..................................... H02K 1/14; H02K 7/18

USPC .............................................. 310/88, 89, 413
See application file for complete search history.

(56) References Cited

U.S. PATENT DOCUMENTS

| | | | | |
|---|---|---|---|---|
| 3,181,896 A | * | 5/1965 | Russell | ................. F16L 19/005 285/119 |
| 4,237,786 A | * | 12/1980 | Sanford | .................. B41F 27/02 101/378 |
| 2006/0278838 A1 | * | 12/2006 | Chavanne | ........... F16K 31/0631 251/129.15 |

FOREIGN PATENT DOCUMENTS

CN          102003329 A  *  4/2011

* cited by examiner

*Primary Examiner* — Jose Gonzalez Quinones
(74) *Attorney, Agent, or Firm* — Norton Rose Fulbright US LLP

(57) ABSTRACT

The present invention relates to a combined end cap and an electromechanical device equipped with the combined end cap. The combined end cap includes: an end cap body, which includes a fitting portion provided with a first mating portion; and an end cap flange, which is configured to have at least two segments adapted to be combined and mounted to the fitting portion, and at least one of the segments is provided with a second mating portion adapted to corporate with the first mating portion to prevent the segments having been combined and mounted to the fitting portion from rotating relative to the fitting portion. The application of this invention can not only significantly improve the versatility and convenience of the existing end caps, but also help to reduce the manufacturing cost.

19 Claims, 2 Drawing Sheets

COMBINED END CAP AND ELECTROMECHANICAL DEVICE EQUIPPED WITH THE COMBINED END CAP

CROSS REFERENCE TO RELATED APPLICATION

The present application claims priority to Application No. CN 201210446083.8, filed in the China on Nov. 9, 2012, which is expressly incorporated herein in its entirety by reference thereto.

FIELD OF THE INVENTION

The present invention relates to an end cap, and in particular, to a combined end cap and an electromechanical device equipped with the combined end cap.

BACKGROUND

Electromechanical devices such as starter, generator and so on have already been widely applied in many fields. There are numerous such electromechanical devices which have powerful functions, and these devices have played an immeasurable role particularly in such aspects of promoting social progress, improving people's life quality, etc. In general, an end cap structure (e.g., a front end cap, a rear end cap, and a drive end cap) is required to be equipped on these electromechanical devices and it will be connected with a housing of the electromechanical device. Existing end caps are typically made by means of mono-block casting. However, since the demands on the quantity of various electromechanical devices are huge and the specific applications are tremendously different, there are considerable differences in demands in terms of such aspects as contour dimensions, installing conditions, arrangements and so on during actual use. Existing various end cap structures, however, can neither adapt to and meet such differential demands, nor will they be advantageous for lowering costs in manufacture, installation and maintenance, thus causing considerable resources idling and wasting.

SUMMARY OF INVENTION

In view of the above, according to a first aspect of the invention, a combined end cap is provided for effectively addressing the above and other problems existing in the prior art. The combined end cap in accordance with the invention includes: an end cap body which includes a fitting portion provided with a first mating portion; and an end cap flange which is configured to have at least two segments adapted to be combined and mounted to the fitting portion, and at least one of the segments is provided with a second mating portion adapted to corporate with the first mating portion to prevent the segments having been combined and mounted to the fitting portion from rotating relative to the fitting portion.

In an advantageous embodiment of the combined end cap in accordance with the invention, the first mating portion includes a protrusion provided on the fitting portion, and the second mating portion is a recess which is provided in at least one of the segments for receiving the protrusion. In addition, a spline connection can also be used between the first mating portion and the second mating portion.

In another advantageous embodiment of the combined end cap in accordance with the invention, the second mating portion is a protrusion provided in at least one of the segments, and the first mating portion includes a recess which is provided in the fitting portion for receiving the protrusion. In addition, a spline connection can also be used between the first mating portion and the second mating portion.

In yet another advantageous embodiment of the combined end cap in accordance with the invention, a spline connection can be used between the first mating portion and the second mating portion.

In still another advantageous embodiment of the combined end cap in accordance with the invention, two adjacent segments of the end cap flange are respectively provided with positioning structures which mate with each other as well as locking structures which mate with each other. Optionally, the positioning structures are positioning pin and positioning hole which are provided on two adjacent segments respectively, and the locking structures are screw hole and through hole which are provided on two adjacent segments respectively and adapted to be locked by screw. Optionally, the end cap flange is configured to have two segments that are spaced apart in the diametric direction of the end cap flange, and each segment is provided with at least one through hole for bolt to pass through.

Moreover, according to a second aspect of the invention, an electromechanical device is also provided which is equipped with a combined end cap according to any one as mentioned above. Such electromechanical device includes starter, generator and starter/generator.

The combined end cap of the invention has numerous advantageous, including flexible configuration, reliable use, easy to manufacture and low cost, etc. The application of the invention can significantly improve the versatility and convenience of the existing end cap structures. According to the invention, a combined end cap of various specifications can be provided by equipping a same end cap body with end cap flanges of different shapes and dimensions, thus making it possible to meet various different application demands very conveniently and flexibly. This is also advantageous for saving considerable expense in structure design and mold manufacture, etc. Meanwhile, since the invention employs a combined modular design, mass production can be realized and thereby manufacture cost can be further reduced. Undoubtedly, the application of the invention can achieve apparently advantageous technical effects, and create tremendous commercial value and considerable social benefits.

DESCRIPTION OF DRAWINGS

The technical solution of the invention will be further described in detail hereinafter in connection with the accompanying drawings and the embodiments. However, it should be understood that these drawings are designed for illustration purpose only and should not be considered as limiting the scope of the invention. In addition, unless otherwise indicated, these drawings are only meant to schematically illustrate the structural configuration described herein, and are not necessarily drawn to scale.

DESCRIPTION OF DRAWINGS

Firstly, it is noted that the specific structures, features and advantages and so on of the combined end cap and the electromechanical device equipped with the combined end cap in accordance with the invention will be particularly described hereinafter by way of examples. However, all the description is for the illustration purpose only and should not be considered as limiting the invention in any way. In addition, any single technical feature described or implied in each embodiment mentioned in the specification or any single technical feature shown or implied in each drawing, or the equivalents thereof can also be combined or deleted in any way so as to obtain more other embodiments of the invention that may have not been directly mentioned in the specification. Besides, for the sake of brevity, identical or similar components and features may be labeled for only one or several of them in the same figure.

Figure 1:
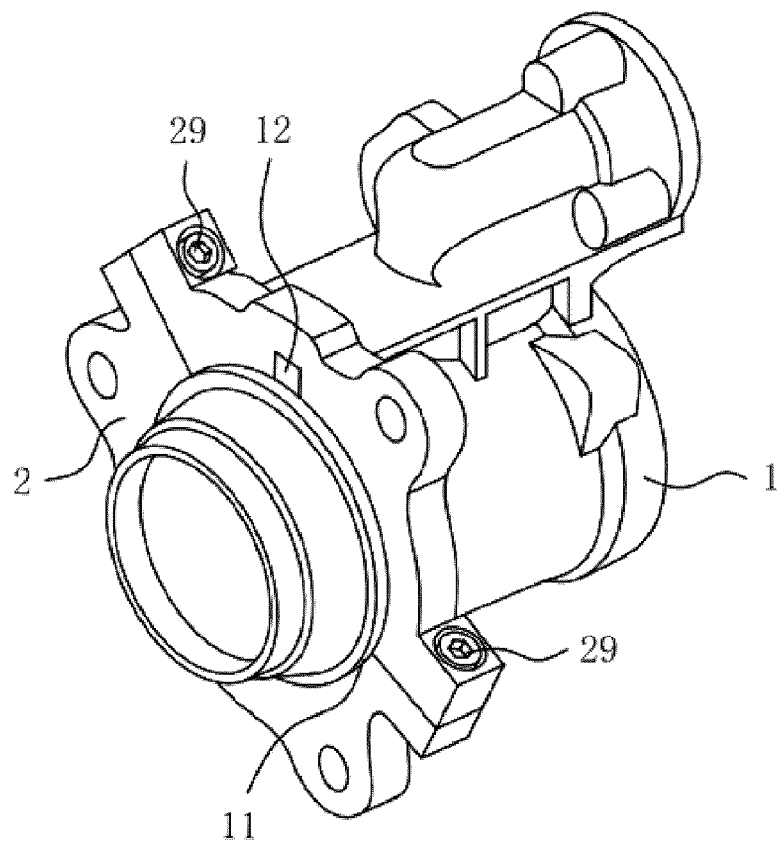
FIG. 1 is a schematic perspective structural view of an embodiment of a combined end cap according to the invention.
Figure 2:
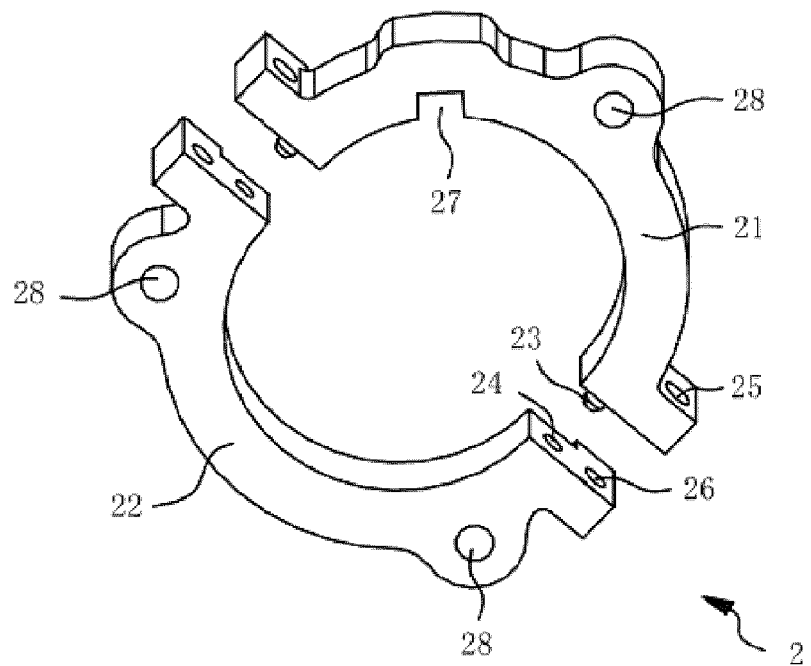
FIG. 2 is a schematic perspective structural view showing that the various segments of the end cap flange in the embodiment of FIG. 1 are in a separated state.
Figure 3:
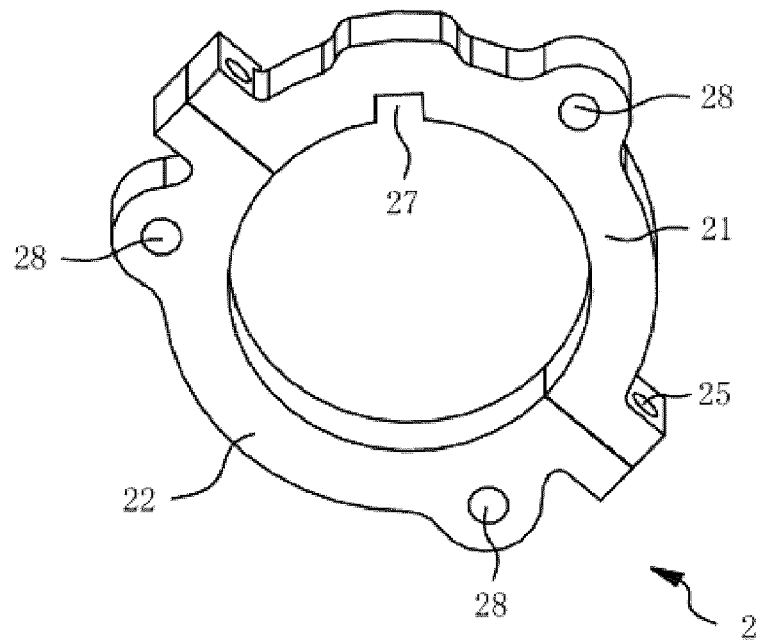
FIG. 3 is a schematic perspective structural view showing that the various segments of the end cap flange in the embodiment of FIG. 1 are in an assembled state.

As compared to and different from various existing one-piece end cap structure, the invention provides a combined end cap which is adapted to be combined for assembly. Reference is made to FIGS. 1, 2 and 3, which substantially show a basis configuration of an embodiment of the combined end cap according to the invention.

As shown in FIG. 1, in this embodiment, the combined end cap mainly includes two portions, i.e., an end cap body 1 and an end cap flange 2, wherein the end cap flange 2 includes a plurality of segments which, after being combined, can be assembled onto the end cap body 1, thus forming an entire end cap.

Specifically, the end cap body 1 includes a fitting portion 11 provided with a first mating portion 12. The first mating portion 12 is configured to mate with a second mating portion 27 which is provided on one or more segments of the end cap flange 2 so as to prevent the segments from rotating relative to the fitting portion 11 after the end cap body 1 and the end cap flange 2 are assembled together, thus ensuring a stable and reliable overall structure of the end cap.

As for the end cap flange 2, it can be configured as two or more separate segments as required by actual application. For example, in the above embodiment, the end cap flange 2 is preferably divided into two segments 21, 22 along its diametric direction. Thus, quick assembly and disassembly, and reduction of complexity of manufacture can be ensured while maximumly meeting various application demands.

The specific implementation of the above first mating portion 12 and the second mating portion 27 will be further described hereinafter.

FIGS. 2 and 3 are schematic perspective structural views of the end cap flange 2 in the above embodiment in different states, showing the two segments 21, 22 of the end cap flange 2 are in a separated state and in an assembled state, respectively. These figures clearly illustrates the structure of the second mating portion 27 provided on the segment 21. As shown in FIGS. 2 and 3, the second mating portion 27 is configured to be in the shape of a recessed groove, whereas the first mating portion 12 on the end cap body 1 which mates with the second mating portion 27 is shown in FIG. 1 to be in the shape of a protruding block which protrudes outwardly. In this manner, when the end cap body 1 and the end cap flange 2 are snapped together by mutual mating between the first mating portion 12 and the second mating portion 27, the entire structure can be kept stable and no relative rotation will occur, even in the case where the end cap is impacted by torque.

It is noted that in the invention, some other manners for realizing the above first and the second mating portions are completely allowable.

Figure 4:
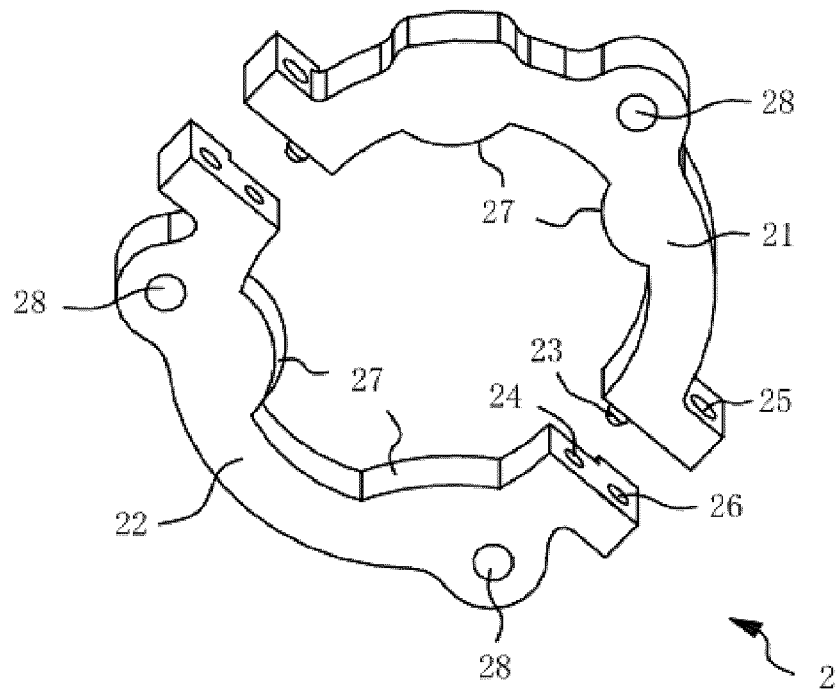
FIG. 4 is a schematic perspective structural view showing that the various segments of the end cap flange in another embodiment of the combined end cap according to the invention are in a separated state.

By way of example, in some embodiments, the second mating portion 27 on the end cap flange 2 can be configured to have a protrusion, whereas the first mating portion 12 on the fitting portion 11 can be configured to have a corresponding recess so as to receive the protrusion on the end cap flange 2. Of course, the above protrusion can be in any shape such as square, triangle, trapezoid and circular arc. Such protrusion can be provided on one or more segments of the end cap flange 2 as required by application, and the specific position on the segments at which the protrusion are arranged can also be set as required. For example, it is shown in FIG. 4 that the two segments 21, 22 of the end cap flange 2 are respectively provided with two second mating portions 27, both of which are configured to be an arc-shaped protrusion.

Again, by way of example, in some other embodiments, the first mating portion 12 on the fitting portion 11 can be configured to have the above described protrusion(s), and meanwhile, corresponding recess(s) for receiving the protrusion(s) are provided on one or more segments of the end cap flange 2.

In addition, in some other embodiments, the first mating portion 12 and the second mating portion 27 can be connected by spline as required (e.g., by straight spline), so as to prevent the segments having been combined and mounted to the fitting portion 11 from rotating relative to the fitting portion 11.

Moreover, in consideration of some applications (e.g., the end cap may endure large torque impact during use), it is also possible that in some embodiments, the above protrusion/recess configuration and spline configuration can be employed simultaneously so as to sufficiently ensure firmness of the end cap structure.

The invention allows for many ways to realize the mounting of the end cap flange 2 onto the end cap body 1. For example, various connectors such as bolt, screw and clam, or any combination thereof can be used to combine and mount each segment of the end cap flange 2 onto the end cap body 1. By way of example, the embodiment of FIGS. 1-3 will again be described hereinafter for illustration purpose.

As shown in FIG. 2, two adjacent segments 21, 22 on the end cap flange 2 can be respectively provided with positioning structures that mate with each other and locking structures that mate with each other. For example, such positioning structures can be a positioning pin 23 and a positioning hole 24 that are provided on the segments 21, 22 respectively, whereas the locking structures can be a screw hole 26 and a through hole 25 provided on the segments 21, 22 respectively so that a screw 29 can be used to lock the two segments and mount them fixedly on the fitting portion 11 of the end cap body 1. FIG. 3 further shows the end cap flange 2 already in an assembled state. Of course, the specific positions at which the above positioning pin 23, the positioning hole 24, the screw hole 26 and the through hole 25 are arranged and the numbers of them can be adjusted as required. It is appreciated that it is also completely feasible to achieve positioning between adjacent segments by using a mating protruding-recessing structure, etc. individually or in a combined way, and to achieve locking between adjacent segments by using a bolt-nut connection, etc. individually or in a combined way.

Finally, the invention further provides an electromechanical device (not shown) equipped with a combined end cap according to the invention. As shown in FIG. 1, by passing a bolt through the through hole 28 in one or more segments of the end cap flange 2, the combined end cap and the housing of the electromechanical device can be connected together. The electromechanical device provided by the invention includes but is not limited to starter, generator, and starter/generator. The combined end cap can be used as a front end cap, a rear end cap or a drive end cap, etc. of these electromechanical devices.

As noted above, since the one-piece end cap structure in the prior art has already gained a very long term widespread application, and the production of many models has been normalized and standardized for a long time through the years, inertia thinking and technical prejudice have developed for those in the art. They tend to manufacture and prepare a one-piece end cap for the electromechanical device by casting process and so on. In contrast, the invention has completely eradicated such technical prejudice by innovatively separating the end cap flange and the end cap body and then designing and manufacturing them independently. Therefore, improvements have been made to modify the existing one-piece end cap structure to be a combined structure, while ensuring a firm and reliable overall structure of the end cap as well as a quick and convenient installation. The special advantages of the invention lie in as follows. By configuring end cap flanges having different dimensions and shapes, etc. in a free and flexible manner and then combining end cap flanges meeting requirements in terms of desired dimensions, shapes, etc onto completely identical end cap bodies during actual application, diverse and differential demands on end cap structure can be fit and met in a very convenient, quick and low cost manner for different applications. Therefore, not only a difficult technical problem that has been hindering the industry for a long time period and remains unsolved has been effectively addressed, but also resources have been sufficiently saved and efficacy has been improved by a low cost mass production of the end cap body having a relatively complicated structure, and a low cost and fast production of the end cap flange which is relatively simple in structure, thereby more significant economic and social benefits can be created.

The combined end cap and electromechanical device equipped with the combined end cap according to the invention are described above by way of example only. These examples are used only for the purpose of illustrating the principle and embodiments of the invention, rather than limiting the invention. Those skilled in the art can also make various modifications and variations thereto without departing from the spirit and scope of the invention. Therefore, all the equivalent technical solutions should fall within the scope of the invention and will be defined by individual claims of the invention.

What is claimed is:

1. A combined end cap for an electromechanical device, comprising:
   an end cap body that includes a fitting portion provided with a first mating portion; and
   an end cap flange that includes at least two segments adapted to be combined and mounted to the fitting portion, wherein at least one of the segments includes a second mating portion adapted to cooperate with the first mating portion to prevent the at least two segments from rotating relative to the fitting portion when the at least two segments combined and mounted to the fitting portion;
   wherein the combined end cap is configured to be connected a housing of the electromechanical device, and
   wherein a surface of a curved portion of the end cap flange contacts at least a portion of a surface of a curved portion of the fitting portion.

2. The combined end cap according to claim 1, wherein the first mating portion includes a protrusion from the fitting portion, and the second mating portion includes a recess for receiving the protrusion.

3. The combined end cap according to claim 2, wherein the first and second mating portions cooperate with each other by a rectangular-shaped connection therebetween.

4. The combined end cap according to claim 1, wherein the second mating portion includes a protrusion from the at least one of the segments, and the first mating portion includes a recess in the fitting portion adapted for receiving the protrusion.

5. The combined end cap according to claim 4, wherein the first and second mating portions cooperate with each other by a rectangular-shaped connection therebetween.

6. The combined end cap according to claim 1, wherein a rectangular-shaped connection is used between the first mating portion and the second mating portion.

7. The combined end cap according to claim 1, wherein a first one of the at least two segments includes at least one positioning structure and at least one locking structure, a second one of the at least two segments includes at least one positioning structure and at least one locking structure, the at least one positioning structure of the first segment mates with the at least one positioning structure of the second segment, and the at least one locking structure of the first segment mates with the at least one locking structure of the second segment.

8. The combined end cap according to claim 7, wherein:
   the at least one positioning structure of one of the first and second segments includes at least one positioning hole and the at least one positioning structure of the other of the first and second segments includes at least one positioning pin;
   the at least one locking structure of one of the first and second segments includes a screw hole and the at least one locking structure of the other of the first and second segments includes a through hole; and
   the first and second segments are adapted to be locked to each other by a screw passing through the through hole and into the screw hole.

9. The combined end cap according to claim 7, wherein the first and second segments are spaced apart from each other in a diametric direction of the end cap flange, and each of the first and second segments is provided with at least one through hole through which a bolt can pass.

10. An electromechanical device, comprising:
    a combined end cap, wherein the combined end cap includes:
    an end cap body that includes a fitting portion provided with a first mating portion; and
    an end cap flange that includes at least two segments adapted to be combined and mounted to the fitting portion, wherein at least one of the segments includes a second mating portion adapted to cooperate with the first mating portion to prevent the at least two segments from rotating relative to the fitting portion when the at least two segments combined and mounted to the fitting portion;
    wherein the combined end cap is configured to be connected a housing of the electromechanical device, and wherein a surface of a curved portion of the end cap flange contacts at least a portion of a surface of a curved portion of the fitting portion.

11. The electromechanical device according to claim 10, wherein the electromechanical device includes a starter or a generator.

12. The electromechanical device according to claim 10, wherein the first mating portion includes a protrusion from the fitting portion, and the second mating portion includes a recess for receiving the protrusion.

13. The electromechanical device according to claim 12, wherein the first and second mating portions cooperate with each other by a rectangular-shaped connection therebetween.

14. The electromechanical device according to claim 10, wherein the second mating portion includes a protrusion from the at least one of the segments, and the first mating portion includes a recess in the fitting portion adapted for receiving the protrusion.

15. The electromechanical device according to claim 14, wherein the first and second mating portions cooperate with each other by a rectangular-shaped connection therebetween.

16. The electromechanical device according to claim 10, wherein a rectangular-shaped connection is used between the first mating portion and the second mating portion.

17. The electromechanical device according to claim 10, wherein a first one of the at least two segments includes at least one positioning structure and at least one locking structure, a second one of the at least two segments includes at least one positioning structure and at least one locking structure, the at least one positioning structure of the first segment mates with the at least one positioning structure of the second segment, and the at least one locking structure of the first segment mates with the at least one locking structure of the second segment.

18. The electromechanical device according to claim 17, wherein:
   the at least one positioning structure of one of the first and second segments includes at least one positioning hole and the at least one positioning structure of the other of the first and second segments includes at least one positioning pin;
   the at least one locking structure of one of the first and second segments includes a screw hole and the at least one locking structure of the other of the first and second segments includes a through hole; and
   the first and second segments are adapted to be locked to each other by a screw passing through the through hole and into the screw hole.

19. The electromechanical device according to claim 17, wherein the first and second segments are spaced apart from each other in a diametric direction of the end cap flange, and each of the first and second segments is provided with at least one through hole through which a bolt can pass.

* * * * *